C. COLAHAN.
TRACTION ENGINE.
APPLICATION FILED FEB. 14, 1918.

1,301,040.

Patented Apr. 15, 1919.
2 SHEETS—SHEET 1.

Inventor.
Chas Colahan

C. COLAHAN.
TRACTION ENGINE.
APPLICATION FILED FEB. 14, 1918.

1,301,040.

Patented Apr. 15, 1919.
2 SHEETS—SHEET 2.

Inventor.
Chas Colahan

UNITED STATES PATENT OFFICE.

CHARLES COLAHAN, OF STOCKTON, CALIFORNIA.

TRACTION-ENGINE.

1,301,040.  Specification of Letters Patent.  Patented Apr. 15, 1919.

Application filed February 14, 1918. Serial No. 217,146.

*To all whom it may concern:*

Be it known that I, CHARLES COLAHAN, a citizen of the United States, and resident of Stockton, in the county of San Joaquin and State of California, have invented certain new and useful Improvements in Traction-Engines, of which the following is a specification, reference being had to the accompanying drawings, forming a part thereof.

This invention relates to improvements in traction engines and more particularly to that type employing endless self-laying traction members on which the vehicle is driven.

Among the objects of the invention is the provision of trucks with gear driven wheels resting on the track, said trucks being free to yield vertically to conform to the contour of the ground over which the track travels.

Heretofore in machines of this class the supporting wheels of the truck are caused to revolve by frictional contact with the flexible platform or rail track upon which it travels.

There are many objections to this old manner of actuating the truck wheels, as obstructions of mud and stones and dirt often will clog and prevent the revolution of the wheels, causing them to drag on the platform track, and occasion loss of power and obstruction to the forward movement of the machine.

The object of my invention is to overcome this great objection, and conserve the power by imparting a positive rotary motion to these several truck wheels independent of the frictional contact of the rail track.

Said truck consists of two independent sections pivoted together centrally, each section having a rigid parallel arm forming a part thereof, extending upwardly and over the pivotal point of its companion section.

Each extended arm is yieldingly supported on top of its companion truck, thus forming a perfectly flexible support and coöperating yielding function the entire length of the track, and providing flexibility in passing over any inequality or obstruction encountered in its travel.

The machine is supported on two endless traction members, one on each side, being of duplicate construction.

The central pivoted shaft of the trucks is provided with a gear drive wheel secured to the shaft thereof, having a sprocket wheel fixed thereon that is actuated by a drive chain secured on the main axle of the track driving sprocket wheel at the rear of the machine.

This gear wheel upon the truck connecting pivotal shaft contacts directly with the central gear of the truck supporting wheels, having a common rotary movement that is in harmony with the rising and falling movements of the trucks, and by means of the intermediate idler gear wheels that engage with the succeeding truck wheels, impart the desired rotation and positive action to the truck wheels independent of the frictional contact of the traveling track upon which the wheels rest.

In the drawings Figure 1 is a side elevation illustrating the traction mechanism in accordance with the invention.

Figure 1:
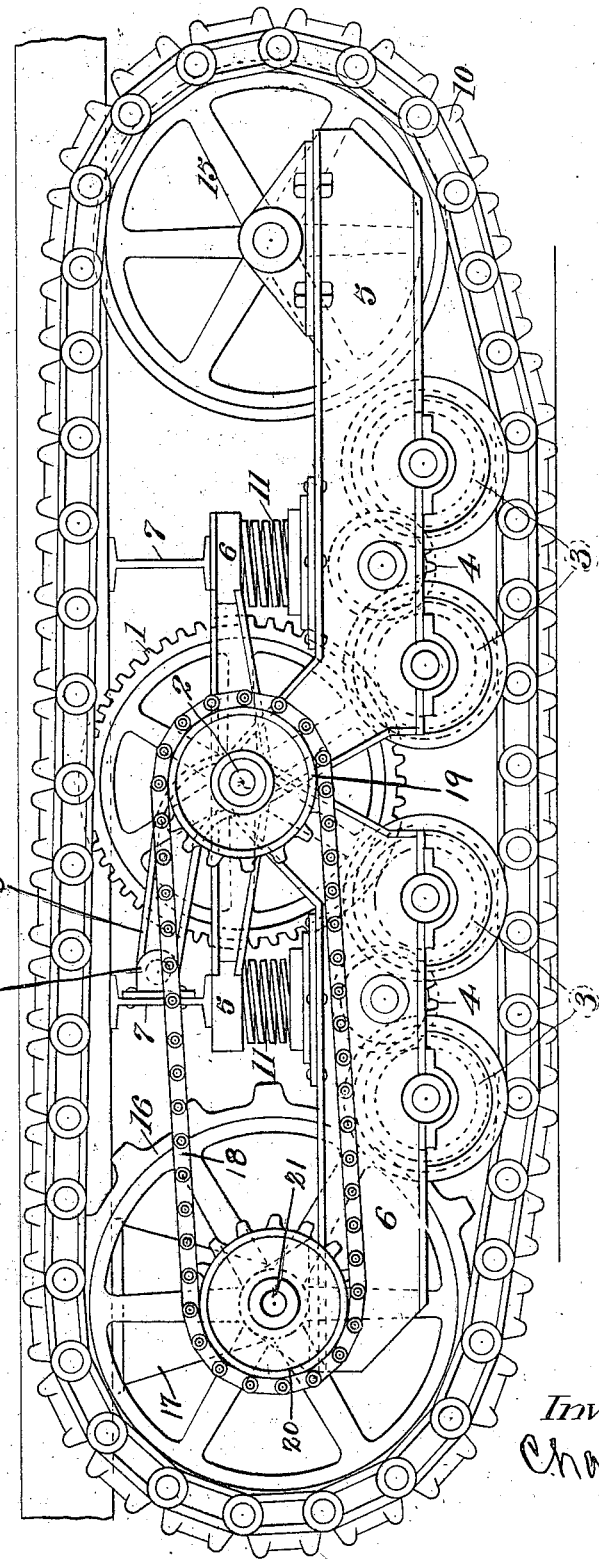
Figure 2:
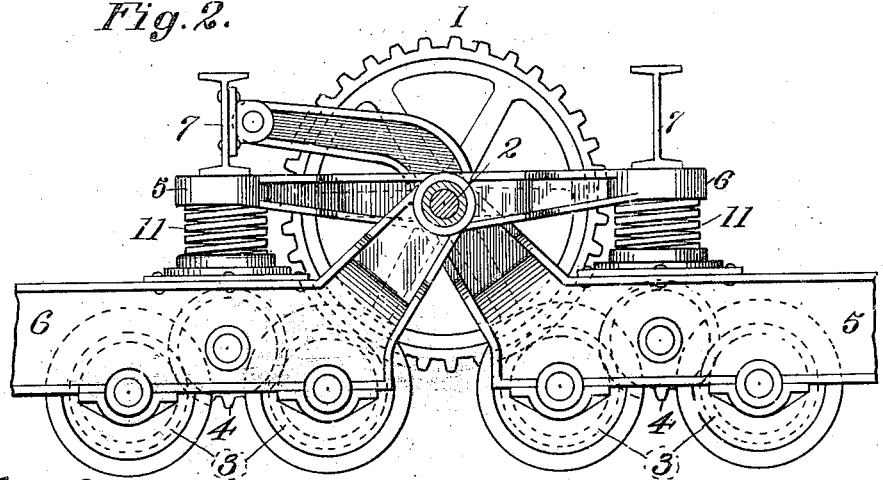
Fig. 2 is an enlarged detail longitudinal section on line 2—2 of Fig. 3.
Figure 3:
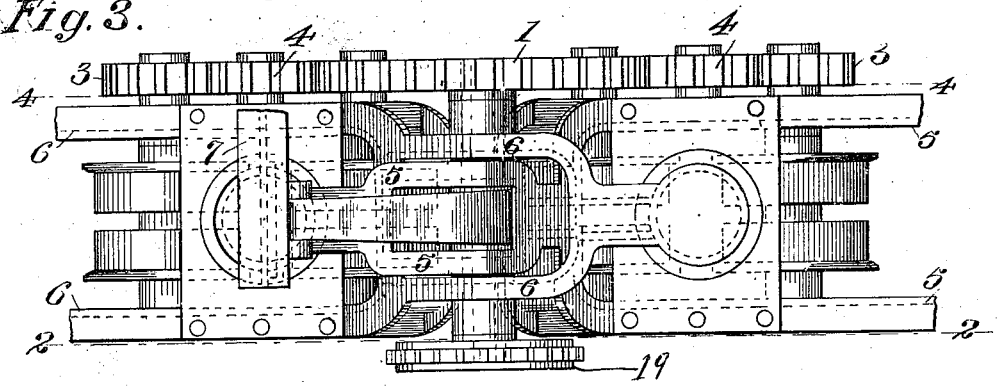
Fig. 3 is a detail plan view of Fig. 2.
Figure 4:
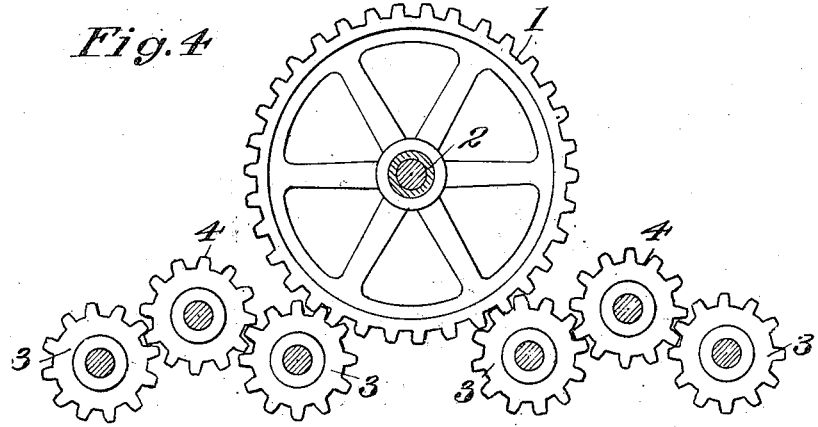
Fig. 4 is a longitudinal section on line 4—4 of Fig. 3 showing the train of the truck driving gear.

The truck sides 5 and 6 preferably are composed of steel castings.

In detail, the construction consists of the traction belt or track comprising the links 10 of any usual form, to be operated by its supporting wheels, 16 being the driving sprocket wheel on shaft 21, which is mounted in journals on the rear of the main frame supported in bracket 17 attached to the main frame of the machine in the usual well known manner; 15 is the front idler supporting wheel that is adjustably mounted on the front end of the vibrating truck and has free vertical movements therewith.

The gear wheel 1 is fixed to shaft 2, which shaft is provided with a chain driving sprocket 19 fixed thereon, and this shaft also forms the pivotal connection of the vibrating truck sides, and is actuated by the driving chain 18 and by sprocket 20 secured on the main driving shaft 21, the gear wheel 1 contacting with and operating the truck wheels 3, 3, there being intermediate idler gear wheels 4, 4, to impart desired direction of continuous rotation of said truck wheels.

7, 7 are the supporting columns beneath the engine frame, resting upon the arms 6—6 of the truck sides 5. 11, 11 are the springs beneath the extended arms of the truck frame, each resting on the corresponding truck, that is maintained in position by the usual securing arm or strut 8 secured at the rear within bracket 8' attached to the supporting column 7 and journaled on shaft 2 at the other end.

The rear sprocket or main driving wheel 16 of the rail track is usually secured and supported in bracket 17 attached to the main frame of the machine, and its corresponding carrying idler wheel is adjustably secured on the front vibrating truck frame, and has the same vertical movement therewith.

Having thus described my invention what I desire to secure by Letters Patent is,

1. In a traction engine, in combination, a traction belt, sprocket and idler wheels over which said belt is carried, flexible truck frames provided with supporting wheels within said belt, an extension arm on each of said frames, a centrally transverse connecting shaft to which said truck frames are pivoted, and a gear mounted on said shaft to actuate the supporting wheels through gear wheels independently of the traction belt.

2. In a tractor, in combination, a main frame, a traction belt, means for carrying and driving said belt, a flexible truck support of two centrally pivoted members mounted on wheels within said belt, and a gear mounted on the truck connecting central pivot or axle to actuate the truck wheels.

3. In a tractor, in combination, a traction belt, means for carrying and driving said belt, a resiliently vibrating truck in two parts mounted on wheels within said belt and traveling thereon, a centrally transverse connecting shaft to which said trucks are co-operatively pivoted, and means for driving the truck wheels separately by a gear mounted on the truck connecting shaft independently of said belt.

4. In a tractor, in combination, a main frame provided with yielding flexible endless traction members, independent wheel trucks upon which the main frame is supported, said trucks being located within the traction members and centrally journaled on a transverse shaft about which the trucks may oscillate, said shaft being provided with a gear to actuate the truck wheels.

5. In a tractor, in combination, a traction belt, means for carrying and driving said belt, a vibratable flexible truck frame in two parts having wheels traveling on said belt, and operated by gears independently of said belt.

CHAS. COLAHAN.

Witnesses:
M. H. COLAHAN,
L. HUGHES.